US 11,035,285 B2

(12) United States Patent
Kloft et al.

(10) Patent No.: US 11,035,285 B2
(45) Date of Patent: Jun. 15, 2021

(54) INTERNAL COMBUSTION MACHINE, MOTOR VEHICLE, AND METHOD FOR OPERATING A MOTOR VEHICLE

(71) Applicant: Volkswagen Aktiengesellschaft, Wolfsburg (DE)

(72) Inventors: Manfred Kloft, Königslutter (DE); Tobias Jaeckel, Braunschweig (DE); Ralf Lüders, Peine (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 322 days.

(21) Appl. No.: 15/788,426

(22) Filed: Oct. 19, 2017

(65) Prior Publication Data

US 2018/0038268 A1  Feb. 8, 2018

Related U.S. Application Data

(63) Continuation of application No. PCT/EP2016/060501, filed on May 11, 2016.

(30) Foreign Application Priority Data

May 20, 2015  (DE) .......................... 102015107926.7

(51) Int. Cl.
*F01P 7/14* (2006.01)
*F01P 7/16* (2006.01)
(Continued)

(52) U.S. Cl.
CPC ................. *F01P 7/165* (2013.01); *F01P 3/20* (2013.01); *F01P 11/04* (2013.01);
(Continued)

(58) Field of Classification Search
CPC .... F01P 7/165; F01P 3/20; F01P 11/04; F01P 2007/146; F01P 2050/24; F01P 2060/08; F16K 11/0876
(Continued)

(56) References Cited

U.S. PATENT DOCUMENTS

| | | | | |
|---|---|---|---|---|
| 6,539,899 B1* | 4/2003 | Piccirilli | ................. | F01P 7/167 |
| | | | | 123/41.08 |
| 6,920,845 B2* | 7/2005 | Lelkes | .................... | F01P 7/167 |
| | | | | 123/41.01 |

(Continued)

FOREIGN PATENT DOCUMENTS

| | | |
|---|---|---|
| DE | 44 32 292 A1 | 3/1996 |
| DE | 198 49 492 A1 | 5/2000 |

(Continued)

OTHER PUBLICATIONS

Search Report including Provisional Assessment of Patentability issued by the German Patent and Trademark Office for German Patent Application No. DE 10 2015 107 926.7, dated Jan. 15, 2016.
(Continued)

*Primary Examiner* — Hung Q Nguyen
*Assistant Examiner* — Anthony Donald Taylor, Jr.
(74) *Attorney, Agent, or Firm* — Manfred Beck

(57) ABSTRACT

An internal combustion machine includes a combustion engine and a cooling system with a coolant pump, a main cooler, a heating heat exchanger, a bypass bypassing the heating heat exchanger, coolant channels, and a regulating device with an actuator for distributing a coolant depending on at least one local coolant temperature. When the actuator is actuated in a given direction, the regulating device allows a coolant flow through the combustion engine and the heating heat exchanger and prevents a coolant flow through the bypass and the main cooler in a first position; addition-
(Continued)

ally allows a coolant flow through the bypass in a second position; and additionally allows a coolant flow through the main cooler in a third position. In a zero position which lies before the first position, the regulating device prevents a coolant flow through the combustion engine and allows a coolant flow through the heating heat exchanger.

16 Claims, 8 Drawing Sheets

(51) Int. Cl.
    *F01P 3/20*     (2006.01)
    *F16K 11/087*     (2006.01)
    *F01P 11/04*     (2006.01)

(52) U.S. Cl.
    CPC ..... *F16K 11/0876* (2013.01); *F01P 2007/146* (2013.01); *F01P 2050/24* (2013.01); *F01P 2060/08* (2013.01)

(58) Field of Classification Search
    USPC ........................................................ 123/41.1
    See application file for complete search history.

(56) References Cited

U.S. PATENT DOCUMENTS

| | | | |
|---|---|---|---|
| 7,168,398 B2* | 1/2007 | Ap | F01P 7/165 123/41.1 |
| 2001/0042525 A1 | 11/2001 | Lehmann | |
| 2003/0079698 A1* | 5/2003 | Morgan | F01P 7/048 123/41.1 |
| 2004/0173167 A1* | 9/2004 | Chanfreau | B60H 1/00485 123/41.1 |
| 2004/0238159 A1 | 12/2004 | Humburg | |
| 2006/0157002 A1* | 7/2006 | Pfeffinger | F01P 7/162 123/41.29 |
| 2006/0201455 A1 | 9/2006 | Chanfreau et al. | |
| 2009/0139686 A1* | 6/2009 | Suzuki | B60K 6/445 165/42 |
| 2012/0048504 A1 | 3/2012 | Park et al. | |
| 2013/0333640 A1 | 12/2013 | Kardos et al. | |
| 2014/0026829 A1 | 1/2014 | Tobergte et al. | |
| 2014/0165932 A1 | 6/2014 | Oh | |
| 2017/0298805 A1 | 10/2017 | Kloft et al. | |

FOREIGN PATENT DOCUMENTS

| | | | | |
|---|---|---|---|---|
| DE | 103 23 900 A1 | | 1/2005 | |
| DE | 103 42 935 A1 | | 4/2005 | |
| DE | 19849492 B4 | | 12/2005 | |
| DE | 602 09 019 T2 | | 8/2006 | |
| DE | 20 2008 005 103 U1 | | 8/2008 | |
| DE | 10 2008 007 766 A1 | | 8/2009 | |
| DE | 102009010947 | * | 6/2010 | ........... F16K 11/163 |
| DE | 102009010947 B3 | | 6/2010 | |
| DE | 10 2010 044 167 A1 | | 5/2012 | |
| DE | 10 2011 119 237 A1 | | 5/2013 | |
| DE | 20 2014 100 189 U1 | | 2/2014 | |
| DE | 10 2013 214 838 A1 | | 5/2014 | |
| DE | 10 2014 219 252 A1 | | 4/2016 | |
| EP | 1 197 644 A1 | | 4/2002 | |
| FR | 2 800 125 A1 | | 4/2001 | |
| FR | 2 850 726 A1 | | 8/2004 | |
| JP | H11313406 A | | 11/1999 | |
| JP | 2012046163 A | | 3/2012 | |
| KR | 101394051 B1 | | 5/2014 | |
| RU | 78733 U1 | | 12/2008 | |
| RU | 2537112 C1 | | 12/2014 | |

OTHER PUBLICATIONS

International Search Report for International Application No. PCT/EP2016/060501 and translation thereof, dated Jul. 25, 2016.
International Preliminary Report on Patentability for International Application No. PCT/EP2016/060501 including Written Opinion of the International Searching Authority and translation thereof, dated Nov. 21, 2017.
Search Report and machine translation thereof, dated May 14, 2019, issued by the State Intellectual Property Office of People's Republic of China for Chinese Patent Application No. 201680025527.7 which is related to U.S. Appl. No. 15/788,426.
Office Action and machine translation thereof, dated May 22, 2019, issued by the State Intellectual Property Office of People's Republic of China for Chinese Patent Application No. 201680025527.7 which is related to U.S. Appl. No. 15/788,426.
Search Report issued by the Federal Institute of Industrial Property, dated Sep. 5, 2019, for Russian Application No. RU 2017 134 120 A which is related to U.S. Appl. No. 15/788,426.
Written Decision on Registration issued by the Korean Intellectual Property Office, dated Aug. 5, 2020, for Korean Application No. KR 10-2017-7033386 which is related to U.S. Appl. No. 15/788,426.

* cited by examiner

INTERNAL COMBUSTION MACHINE, MOTOR VEHICLE, AND METHOD FOR OPERATING A MOTOR VEHICLE

CROSS-REFERENCE TO RELATED APPLICATIONS

This application is a continuation, under 35 U.S.C. § 120, of copending International Application No. PCT/EP2016/060501, filed May 11, 2016, which designated the United States; this application also claims the priority, under 35 U.S.C. § 119, of German Patent Application No. DE 10 2015 107 926.7, filed May 20, 2015; the prior applications are herewith incorporated by reference in their entirety.

BACKGROUND OF THE INVENTION

Field of the Invention

The invention relates to an internal combustion machine, a motor vehicle having such an internal combustion machine, and a method for operating a motor vehicle.

Internal combustion machines for motor vehicles generally include a cooling system in which a coolant is pumped in at least one cooling circuit through the use of at least one or more pumps and in the process absorbs heat energy from components integrated in the cooling circuit, in particular a combustion engine and an oil cooler and/or a charge air cooler. This heat energy is subsequently discharged in an ambient heat exchanger, the so-called main (water) cooler or radiator, and at times in a heating heat exchanger to the ambient air, in the case of the heating heat exchanger to the ambient air provided for a climate control of the interior of the motor vehicle.

Cooling systems of modern motor vehicles frequently have a plurality of cooling circuits. For example, it is known to provide a so-called large or main cooling circuit and a small cooling circuit, which are integrally formed in certain sections, and wherein through the use of a thermostat-controlled valve the coolant is either conducted via the large or the small cooling circuit. This takes place as a function of the temperature of the coolant so that for example during a warming-up phase of the internal combustion machine, when the coolant has not yet reached an intended operating temperature range, the coolant is conveyed in the small cooling circuit, as a result of which the main cooler, i.e. the ambient heat exchanger in which the coolant is mainly cooled by way of a heat transfer to the ambient air, is bypassed. When, by contrast, the coolant has reached the operating temperature range, the coolant is conducted in the large cooling circuit through the use of the thermostat-controlled valve so that by way of a heat transfer from the coolant to the ambient air, an overheating of the cooling system is avoided. The heating heat exchanger as second ambient heat exchanger by contrast is regularly integrated in the small cooling circuit, as a result of which a heating of the interior of the motor vehicle is made possible even during the warming-up phase of the internal combustion machine.

In the case of conventionally driven motor vehicles, in which the propulsion drive power is exclusively generated through the use of an internal combustion machine, so-called mechanically driven coolant pumps are generally employed, which are driven by the combustion engine itself. Such mechanically driven coolant pumps can have a simple construction and can therefore be produced cost-effectively. However, the dependency of the drive rotational speed of the coolant pumps on the rotational speeds of the output shafts (for example crankshafts or camshafts) of the associated combustion engines can prove to be disadvantageous in mechanically driven coolant pumps. Even with conventionally driven motor vehicles, this dependency can have a negative effect in that a configuration of a coolant pump in terms of an adequate rate of delivery at relatively low rotational speeds could lead to an over dimensioning of the rate of delivery at high rotational speeds of the output shaft of the combustion engine. However, such a problem can be avoided or at least mitigated by a regulatable configuration of a mechanically driven coolant pump. Such a regulatable mechanically driven coolant pump is known for example from German Patent Application Publication No. DE 10 2010 044 167 A1.

In the cooling systems of modern motor vehicles, the main regulation of the volumetric flow of the coolant can thus take place through the use of regulatable cooling pumps while the distribution of the volumetric flow over the individual components each having a different cooling requirement can be controlled by valves that are activated in particular via thermostats. For example, German Patent Application Publication No. DE 103 42 935 A1 discloses an internal combustion machine with a cooling circuit including a pump that is mechanically driven by a combustion engine. The volumetric rate of delivery of the pump is thus dependent on the rotational speed of the combustion engine. In order to achieve individually adapted volumetric flows of the coolant for a plurality of heat exchangers integrated in the cooling circuit, such as in particular cooling channels of a cylinder crankcase and of a cylinder head of the combustion engine and a heating heat exchanger for an interior heating of a motor vehicle driven by the internal combustion machine, a plurality of regulating valves that are each individually activatable are integrated in the cooling circuit. The cooling system known from German Patent Application Publication No. DE 103 42 935 A1 is therefore expensive in its construction.

In the case of hybrid vehicles, i.e. motor vehicles with a hybrid propulsion drive, in the case of which the propulsion drive power is at least temporarily generated by both an internal combustion machine (directly or indirectly) and also by an electric motor, the combustion engine of the internal combustion machine is switched off frequently and also for an extended period of time although the motor vehicle has been put into service and in particular is also moved by the electric propulsion drive. In order to (partially) maintain the functionality of the cooling system even in such an operating state of a hybrid vehicle, for example in order to make possible a cooling of individual components of the drive train and/or a temperature-control of an interior of the motor vehicle, electrically driven coolant pumps are often employed with hybrid vehicles, the drive of which is exclusively effected by an electric motor provided for this purpose. The electric motor-coolant pump units available on the market for this purpose are relatively expensive.

In the German Utility Model No. DE 20 2008 005 103 U1 the possibility is disclosed, furthermore, to have auxiliary units of a combustion engine and among other things a cooling water pump driven by an electric motor via a V-belt drive.

SUMMARY OF THE INVENTION

It is accordingly an object of the invention to provide an internal combustion machine, a motor vehicle, and a method for operating a motor vehicle which overcome the above-mentioned disadvantages of the heretofore-known internal combustion machines and motor vehicles of this general type and which facilitate an adaptation of the coolant flow through the individual components of a cooling system of an internal combustion machine in as simple and cost-effective a manner as possible. Here, the delivery of coolant, in particular to a heating heat exchanger of the cooling system, should be possible in particular during a non-operation of the combustion engine of the internal combustion machine.

With the foregoing and other objects in view there is provided, in accordance with the invention, an internal combustion machine including:

a combustion engine;

a cooling system having a coolant pump, a main cooler, a heating heat exchanger, a bypass bypassing the heating heat exchanger, coolant channels in the combustion engine, and a regulating device with an actuator for a regulated distribution of a coolant as a function of at least one local coolant temperature;

the regulating device, upon an activation of the actuator in a given direction:

in a first position of the regulating device, the regulating device permitting a coolant flow through the combustion engine and the heating heat exchanger and preventing a coolant flow through the bypass and the main cooler;

in a second position of the regulating device, the regulating device additionally permitting a coolant flow through the bypass;

in a third position of the regulating device, the regulating device additionally permitting a coolant flow through the main cooler; and in a zero position of the regulating device, the zero position being located before the first position, the regulating device preventing a coolant flow through the combustion engine and permitting a coolant flow through the heating heat exchanger.

The object of the invention is achieved by an internal combustion machine as defined above and in the patent claims. A motor vehicle having such an internal combustion machine is also the subject of the patent claims. Advantageous embodiments of the internal combustion machine according to the invention and of the motor vehicle according to the invention are subjects of further patent claims and are described in the following description of the invention. The patent claims further define a method for operating a motor vehicle according to the invention.

A generic internal combustion machine is described in the German Patent Application Publication No. DE 10 2014 219 252.8 which was published after the priority date of the instant application. This internal combustion machine includes a regulating device which, through the use of an actuator moving a first gate valve and a second gate valve, which second gate valve is co-moved in certain phases by the first gate valve, makes it possible to implement in a comparatively simple manner a coolant feed to the various components of a cooling system of the internal combustion machine wherein the coolant feed is adapted dependent on an operation. Here, a coolant pump that is mechanically driven, i.e. driven by a shaft of a combustion engine of the internal combustion machine, is employed.

The invention, on the one hand, relates to an internal combustion machine which includes at least a combustion engine and a cooling system, wherein the cooling system includes at least a coolant pump, a main cooler, a heating heat exchanger, a bypass bypassing the heating heat exchanger, coolant channels in the combustion engine and a regulating device with a (preferentially electric, if required hydraulic and/or pneumatic) actuator for the regulated distribution of the coolant in dependence on at least a local coolant temperature, wherein it is provided that the regulating device upon an activation of the actuator in an (activation or movement) direction permits in a first position a coolant flow through the combustion engine and the heating heat exchanger and prevents a coolant flow through the bypass and the ambient heat exchanger;

in a second position additionally permits a coolant flow through the bypass; and in a third position additionally (compared to at least the first position) permits a coolant flow through the main cooler.

Such an internal combustion machine makes possible, by way of an intelligent sequence of activating and deactivating the individual components of the cooling system (which are to be regulated with regard to the flow-through by a coolant) to regulate these through the use of merely one actuator to be activated.

In particular it can be provided here that in the first position of the regulating device merely a relatively small volumetric flow of the coolant through the use of the coolant pump is delivered through a small cooling circuit of the cooling system (bypassing the main cooler), wherein merely the combustion engine (at least partly) and the heating heat exchanger are being flowed through. Because of the fact that only a relatively small volumetric flow of the coolant is delivered through the combustion engine, a rapid warming-up of the relevant part quantity of the coolant and consequently a relatively early functional effectiveness of the heating heat exchanger and thus of a heating of a motor vehicle, for the drive of which the internal combustion machine is preferentially provided, can be achieved in particular during a warming-up phase of the internal combustion machine.

A "heating heat exchanger" is to consequently mean a heat exchanger in which a heat transfer from the coolant of the cooling system to ambient air, which is provided for heating an interior of a motor vehicle, takes place. The heating heat exchanger, just like the main cooler, thus constitutes an ambient heat exchanger.

By activating the bypass in the second position of the regulating device, an overheating of the cooling system can then be avoided with increasing operating temperature of the internal combustion machine in that, still in the small cooling circuit and thus subject to bypassing the main cooler, a larger volumetric flow of the coolant is delivered through the combustion engine. The bypass bypassing the heating heat exchanger can be advantageous here since the maximum volumetric flow through the heating heat exchanger, which is delimited by the cross sections of the flow conduits of the heating heat exchanger and the lines of the cooling system leading to the same and away from the same, is preferentially dimensioned relative small and consequently not the entire volumetric flow of the coolant can and is to be conducted through the heating heat exchanger in the second position of the regulating device. This applies in particular since it can be provided that the heating heat exchanger in the first and all subsequent positions of the regulating device is flowed through by the coolant.

In the third position of the regulating device, activation of the main cooler then takes place which by a heat transfer from the coolant to ambient air serves in particular for the exclusive purpose of a cooling of the coolant. Thus, it can be provided that in the third position of the regulating device the coolant is delivered in a large cooling circuit of the cooling system.

According to another feature of the invention, the regulating device in the third position prevents a coolant flow through the bypass again. In order to ensure that in the third position the entire coolant is conducted either through the heating heat exchanger or the main cooler it can be provided in a preferred embodiment of the internal combustion machine according to the invention that the regulating device in the third position again prevents a coolant flow through the bypass.

In such an internal combustion machine it is provided according to the invention that the regulating device in a zero position situated before the first position, prevents a coolant flow through the combustion engine and permits a coolant flow through the heating heat exchanger.

Because of this, a heating circuit for the coolant can be created which, in particular with respect to the components of the cooling system defined above, can merely incorporate the coolant pump and the heating heat exchanger (and partly the regulating device). This allows to utilize the functionality of the heating heat exchanger and thus to operate in particular an interior heater of a motor vehicle according to the invention even when a cooling functionality for cooling individual or all remaining components (to be cooled) of the cooling system is not required, wherein the motor vehicle includes an internal combustion machine according to the invention (preferably for generating a propulsion drive power).

This can be the case, in particular when the combustion engine of the internal combustion machine according to the invention is not operated, as a result of which no waste heat is generated by the combustion engine, wherein the waste heat would have to be transported by the coolant to the main cooler in particular and from there passed on to the ambient air. This can be relevant for example when the combustion engine of the internal combustion machine is not operated, but the same applies however to other components of the internal combustion machine (and thus the internal combustion machine per se) and if appropriate also to the motor vehicle according to the invention. This can be the case, for example, when the combustion engine in the stationary state of the motor vehicle has been automatically switched off ("automatic start-stop"), wherein the functionality of the interior heater of the motor vehicle is to be maintained further on. Furthermore, a corresponding operating state for the motor vehicle is possible in particular when the same is to be preheated prior to an intended utilization ("independent heater functionality").

Furthermore, a non-operation of the combustion engine of the internal combustion machine with simultaneous operation of the motor vehicle (and if applicable also of other components of the internal combustion machine) can be provided in particular when the same is a hybrid vehicle which is characterized by an additional electric propulsion drive, in operating states of such a hybrid vehicle, in which the propulsion drive power is exclusively generated by the electric propulsion drive, the combustion engine is generally not in operation so that the same does not consume any fuel. However, the functionality of the interior heating should still be available when required even in these operating states.

According to another feature of the invention, the internal combustion machine includes an electric motor. The coolant pump has a delivery element which is driveable by the electric motor. In order to make it possible to drive the coolant pump even during the non-operation of the combustion engine, it can thus preferably be provided that a delivery element and in particular a pump wheel of the coolant pump is driveable by an electric motor.

According to a further feature of the invention, the internal combustion machine includes a transmission. The delivery element of the coolant pump is driveable by the electric motor via the transmission. In order to allow as flexible as possible a positioning for the electric motor in this case, it can thus be preferably provided that the delivery element is driveable via a transmission, in particular a belt transmission (e.g. toothed belt transmission) or a gearwheel transmission, by the electric motor.

According to another feature of the invention, a coolant pump drive cooling circuit is provided for cooling the electric motor. According to a further feature of the invention, power electronics connected to the electric motor are provided and the coolant pump drive cooling circuit cools the electric motor and/or the power electronics.

Further preferably, a cooling pump drive cooling circuit can thus be provided for cooling the electric motor and/or power electronics being associated with the electric motor. This cooling pump drive cooling circuit is preferentially configured in a direct manner so that coolant delivered by the delivery element of the coolant pump (in particular a part flow of the total flow delivered by the coolant pump) is exclusively conducted via the electric motor and/or the associated power electronics and not utilized for cooling further components.

It can be preferentially provided, furthermore, that the electric motor and/or the associated power electronics are received in the same housing or attached to the same, in which the coolant pump is also integrated. In particular it can thereby be made possible to at least partly integrate the cooling channels forming the cooling pump drive cooling circuit in this housing. Particularly preferably it can be provided that a (one-part or multi-part) housing receives or, respectively, integrates (at least) the coolant pump, the regulating device and the electric motor as well as optionally also the associated power electronics.

Through the possibility of electrically driving the coolant pump of the internal combustion machine provided according to the invention the possibility is created, furthermore, in a relatively simple manner to increase the rate of delivery of the coolant pump and thus the cooling output of the cooling system compared with purely mechanically driven coolant pumps at relatively low rotational speeds of the combustion engine. This improved cooling output at relatively low rotational speeds of the combustion engine can make it possible to let the combustion engine operate with higher compressions, wherein a higher knocking tendency which usually results from the higher compressions, which is observed in particular at relatively low rotational speeds of the combustion engine, can be compensated through the improved cooling output. In this way, it can be made possible in particular to form the combustion engine as an Atkinson engine or at least in such a manner that the same is operable in a derived Atkinson process which can at least partly be accompanied by a relatively high compression of the gas in the combustion engine and thus by a relatively high knocking tendency.

In the known manner, an Atkinson engine is generally characterized by different piston strokes and thus stroke volumes for on the one hand the suction and compression and on the other hand the expansion and expulsion. This can be realized with an additional crank swing arm and a further connecting rod between crankshaft and piston. During a crankshaft revolution, the piston then moves up and down twice. The advantage lies in that the gas through the extended expansion stroke of the piston is further expanded and thus the exhaust gas temperature is reduced as a result of which the efficiency can be increased. However, the cubic capacity-specific power drops at the same time. During the so-called derived Atkinson process, the effects of different piston strokes with conventional four-stroke reciprocating piston engines (in particular Otto cycle engines) are simulated by changed valve control times and in particular extended opening times of the exhaust valves.

According to another feature of the invention, a heating device is provided through which the coolant can flow in the zero position of the regulating device.

Since in the zero position of the regulating device a flow through the combustion engine (and in particular also all remaining components regularly transferring heat energy to the coolant) is not provided, the combustion engine (and also the other components) is eliminated as heat source for the interior heating. Preferentially, a heating device is therefore integrated in the cooling system which in the zero position of the regulating device can be flowed through by the coolant (or, respectively, is flowed through during the operation of the coolant pump). This heating device, which can for example be an electric heating device, for example a PTC (positive thermal coefficient) heating element, or a chemical (e.g. latent heat storage unit) heating device, can thus serve as replacement heat source in the relevant operating states of the internal combustion machine or of the motor vehicle in order to maintain the functionality of the interior heating of the motor vehicle.

According to another feature of the invention, the regulating device in at least one position including the first position, the second position, and/or the third position prevents a direct connection between the coolant pump and the heating heat exchanger.

In a further preferred configuration of the internal combustion machine according to the invention it can be provided that the regulating device in the first, second and/or third position, in particular in all positions with the exception of the zero position, prevents a direct connection (i.e. a connection which is not conducted via at least one of the remaining components mentioned in the independent claims) between the coolant pump and the heating heat exchanger. This can be achieved in an advantageous configuration in that the regulating device closes a connection between the coolant pump and the combustion engine formed in the zero position by coolant lines of the cooling system and simultaneously opens a connection between the coolant pump and the heating heat exchanger. Both can be effected, in particular, through the use of a single closure element. Because of this it can be avoided that during the operation of the combustion engine a part of the coolant is directly delivered from the coolant pump to the heating heat exchanger, as a result of which this part of the coolant would not absorb any heat energy of components of the internal combustion machine to be cooled and in particular of the combustion engine, which however during the operation of the combustion engine is desired in order to be able to refrain in particular from operating the additional heating device that may be provided.

Preferentially it can be provided that all positions of the regulating device with the exception of the zero position (and the third position in the non-operation mode of the internal combustion machine or of the motor vehicle) are only adjusted during the operation of the combustion engine.

An advantageous cooling of the combustion engine of the internal combustion machine according to the invention can be achieved when both a cylinder housing (in particular a cylinder crankcase housing) as well as a cylinder head of the combustion engine each includes at least one cooling channel, wherein the cooling channels, controlled by the regulating device, can be flowed through by the coolant to suit requirements. Here it can be provided in particular that the regulating device in the first position permits a coolant flow through the coolant channel of the cylinder head and prevents a coolant flow through the coolant channel of the cylinder housing. Because of this it can be achieved that during an operation of the combustion engine of the internal combustion machine during a warming-up phase the coolant is merely conducted through the cylinder head (and the heating heat exchanger) of the internal combustion machine, which compared with the cylinder housing is subjected to higher thermal load and has a lower mass which in this operating state of the internal combustion machine if applicable still absorbs heat energy from the coolant, as a result of which the rapid warming-up of the coolant which is advantageous not only for the heating output of the heating heat exchanger can be achieved but at the same time a cooling for the cylinder head can also be already achieved. A flow through the coolant channel of the cylinder housing by contrast is not yet provided as a result of which it can be achieved that in this operating state a faster warming up on cylinder walls of the cylinder housing can be achieved which has a positive effect on friction losses between cylinder and piston and on the emission behavior of the internal combustion machine.

Connecting the coolant channel of the cylinder housing into the cooling system is preferentially effected only in an intermediate position of the regulating device which lies between the second position and the third position, wherein the operating temperature of the internal combustion machine can then be already so high that a cooling also of the cylinder housing is practical or necessary.

In a preferred configuration of the internal combustion machine according to the invention it can be additionally provided, furthermore, that an adjustment between at least two of the positions of the regulating device is possible in a stepped or stepless manner so that the regulating device can be set into one or more part steps and also be held in these. Because of this, a further improved adaptation of a flow through the individual components can be achieved through the use of the coolant as a function of the actual requirement.

According to another feature of the invention, the regulating device is adjustable between the second position and the third position as a function of an operating characteristic diagram of the internal combustion machine. It can thus be provided, furthermore, that the regulating device is adjustable as a function of an operating characteristic diagram of the combustion engine of the internal combustion machine between at least two positions of the regulating device and in particular between the second position and the third position. In such an operating characteristic diagram in particular the load over the rotational speed, with which the combustion engine of the internal combustion machine is operated, can be plotted. Because of this, a heat transfer from the coolant to ambient air in the main cooler as a function of the operating state and consequently as a function of the heat generation of the combustion engine can be advantageously controlled. This makes possible for example to keep a temperature of the coolant as constant as possible or if required regulate the same to a defined value (range) which can in particular be dependent also on the operating state of the combustion engine. In particular, a higher coolant temperature can be adjusted or regulated at a relatively low load and/or rotational speed which can lead to a correspondingly high oil temperature and thus relatively low friction losses. At a higher load and/or rotational speed, the coolant temperature by contrast can be reduced to protect the combustion engine from thermal overloading. Because of this, a forward-looking regulation of a temperature of the coolant can be possible as well which, unlike for example a corresponding regulation by a temperature sensor, is configured so as not to react to a temperature change that has already taken place. Particularly preferably it can be provided here that the adjusting between the at least two positions as a function of the operating characteristic diagram of the combustion engine is provided stepped or steplessly.

In a relatively simple realizable embodiment of the internal combustion machine according to the invention in terms of its construction, it can be provided that the regulating device includes a gate valve that is translationally and/or rotationally moved by the actuator, the movement of which brought about by the actuator leads to a closing or opening of inlets and/or outlets corresponding to the positions of the regulating device, which (combined with corresponding coolant lines), connect the regulating device to the relevant components of the cooling system in a fluid-conducting manner.

Possibly it can also be advantageous when the regulating device includes more than one gate valve, wherein it is then preferably provided that only a first of the gate valves is moved by the actuator while a movement of the other gate valve or gate valves (in at least one section of the movement of the first gate valve) is brought about by the first gate valve.

According to another feature of the invention, the regulating device includes a first gate valve and a second gate valve, the first gate valve is moved by the actuator, the second gate valve is moved by the first gate valve, wherein a closure position of the second gate valve represents the zero position of the regulating device.

According to a further feature of the invention, the first gate valve has a movement range and the first gate valve moves the second gate valve only in given sections of the movement range of the first gate valve.

It has proved to be advantageous in terms of the structural configuration when the regulating device includes a first gate valve moved by the actuator and a second gate valve moved by the first gate valve, wherein the second gate valve is provided (preferentially exclusively) for reaching the zero position and the first position of the regulating device in that a closure position of the second gate valve establishes the zero position of the regulating device and the same for reaching the first position is moved into an opening position. Here it can be particularly preferably provided that the first gate valve only partly co-moves the second gate valve in its movement range. This makes possible in particular a simplified configuration of the second gate valve, which in the preferred configuration of the internal combustion machine according to the invention is merely moved upon an adjustment of the regulating device between the zero position and the first position (and if appropriate the other way around), while a movement of the second gate valve during an adjustment of the regulating device between the other positions through the use of the first gate valve is no longer provided. Such a coupling of the first and second gate valve can be achieved for example through the use of a coupling lever transmission, a Geneva drive transmission and/or a cam transmission.

A position-securing feature for the second gate valve which if appropriate is not permanently coupled to the first gate valve can be based in particular on a force-fit (force-lock) in that for moving the second gate valve forces overcoming the force-fit are required which are greater than those forces which materialize as a consequence of the mass of the second gate valve, i.e. due to inertia or gravity, and/or because of a hydraulic pressure of the coolant on the second gate valve in the movement directions made possible through the mounting of the second gate valve. Alternatively or additionally, a form-fit position-securing feature can also be provided. Here, a position-securing feature of the second gate valve can be effected in particular by way of the first gate valve.

According to another feature of the invention, the first gate valve and/or the second gate valve is configured as a rotary slide valve.

A configuration of the internal combustion machine according to the invention which is simple in its construction and advantageous in particular with respect to the required installation space is characterized in that the gate valve or gate valves are configured as rotary slide valves.

According to a further feature of the invention, a coolant temperature sensor is disposed in one of the coolant channels.

The activation of the actuator of the regulating device furthermore takes place preferably as a function of a local temperature assigned to the combustion engine which is thus measured particularly preferably in a coolant channel (particularly preferably in a place which is located nearer an outlet of this coolant channel than an inlet) and/or in a section of the cooling system that is connected to an outlet of this coolant channel. To this end, the internal combustion machine according to the invention can include a coolant temperature sensor that is disposed in the coolant channel of the combustion engine or in a coolant line which in flow direction of the coolant directly follows this coolant channel.

If only one temperature sensor is to be provided, it is preferentially disposed in a coolant channel of the cylinder head of the combustion engine. An improved regulation of the distribution of the coolant through the use of the regulating device can be achieved however in that the same is activated as a function of both a local temperature of the coolant in the cylinder head and also a local temperature of the coolant in the cylinder housing. Accordingly, a first coolant temperature sensor disposed in a coolant channel of the cylinder head and a second coolant temperature sensor disposed in a coolant channel of the cylinder housing can be provided.

With the objects of the invention in view there is also provided, a motor vehicle including:

a combustion engine for generating a propulsion drive power;

a cooling system having a coolant pump, a main cooler, a heating heat exchanger, a bypass bypassing the heating heat exchanger, coolant channels in the combustion engine, and a regulating device with an actuator for a regulated distribution of a coolant as a function of at least one local coolant temperature;

the regulating device; upon an activation of the actuator in a given direction:
  in a first position of the regulating device, the regulating device permitting a coolant flow through the combustion engine and the heating heat exchanger and preventing a coolant flow through the bypass and the main cooler;

in a second position of the regulating device; the regulating device additionally permitting a coolant flow through the bypass;

in a third position of the regulating device, the regulating device additionally permitting a coolant flow through the main cooler; and in a zero position of the regulating device, the zero position being located before the first position, the regulating device preventing a coolant flow through the combustion engine and permitting a coolant flow through the heating heat exchanger.

According to another feature of the invention, the motor vehicle additionally includes an electric propulsion drive.

The motor vehicle according to the invention can in particular be a wheel-based motor vehicle (preferentially passenger car or utility vehicle).

With the objects of the invention in view there is further provided, a method for operating a motor vehicle, the method including:

providing a combustion engine, an electric propulsion drive, and a cooling system having a coolant pump, a main cooler, a heating heat exchanger, a bypass bypassing the heating heat exchanger, coolant channels in the combustion engine, and a regulating device with an actuator for a regulated distribution of a coolant as a function of at least one local coolant temperature;

permitting a coolant flow through the combustion engine and the heating heat exchanger and preventing a coolant flow through the bypass and the main cooler in a first position of the regulating device upon activating the actuator in a given direction;

additionally permitting a coolant flow through the bypass in a second position of the regulating device;

additionally permitting a coolant flow through the main cooler in a third position of the regulating device;

preventing a coolant flow through the combustion engine and permitting a coolant flow through the heating heat exchanger in a zero position of the regulating device, wherein the zero position is located before the first position; and holding the regulating device in the zero position during a non-operation of the combustion engine and during a generation of a propulsion drive power by the electric propulsion drive.

Another mode of the invention includes permitting a coolant flow through a heating device in the zero position of the regulating device.

A further mode of the invention includes preventing a direct connection between the coolant pump and the heating heat exchanger in the first position, the second position, and/or the third position of the regulating device.

Another mode of the invention includes preventing a coolant flow through the bypass again in the third position of the regulating device.

Yet another mode of the invention includes moving a first gate valve of the regulating device with the actuator and moving a second gate valve of the regulating device with the first gate valve, wherein a closure position of the second gate valve represents the zero position of the regulating device.

The indefinite article ("a"), in particular in the patent claims and in the description generally explaining the patent claims, must be understood as such and not as a numerical word. Components thus put in concrete terms have to be understood to mean that these are to be present at least once and can be present multiple times.

Although the invention is illustrated and described herein as embodied in an internal combustion machine, a motor vehicle, and a method for operating a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

DETAILED DESCRIPTION OF THE INVENTION

Figure 1:
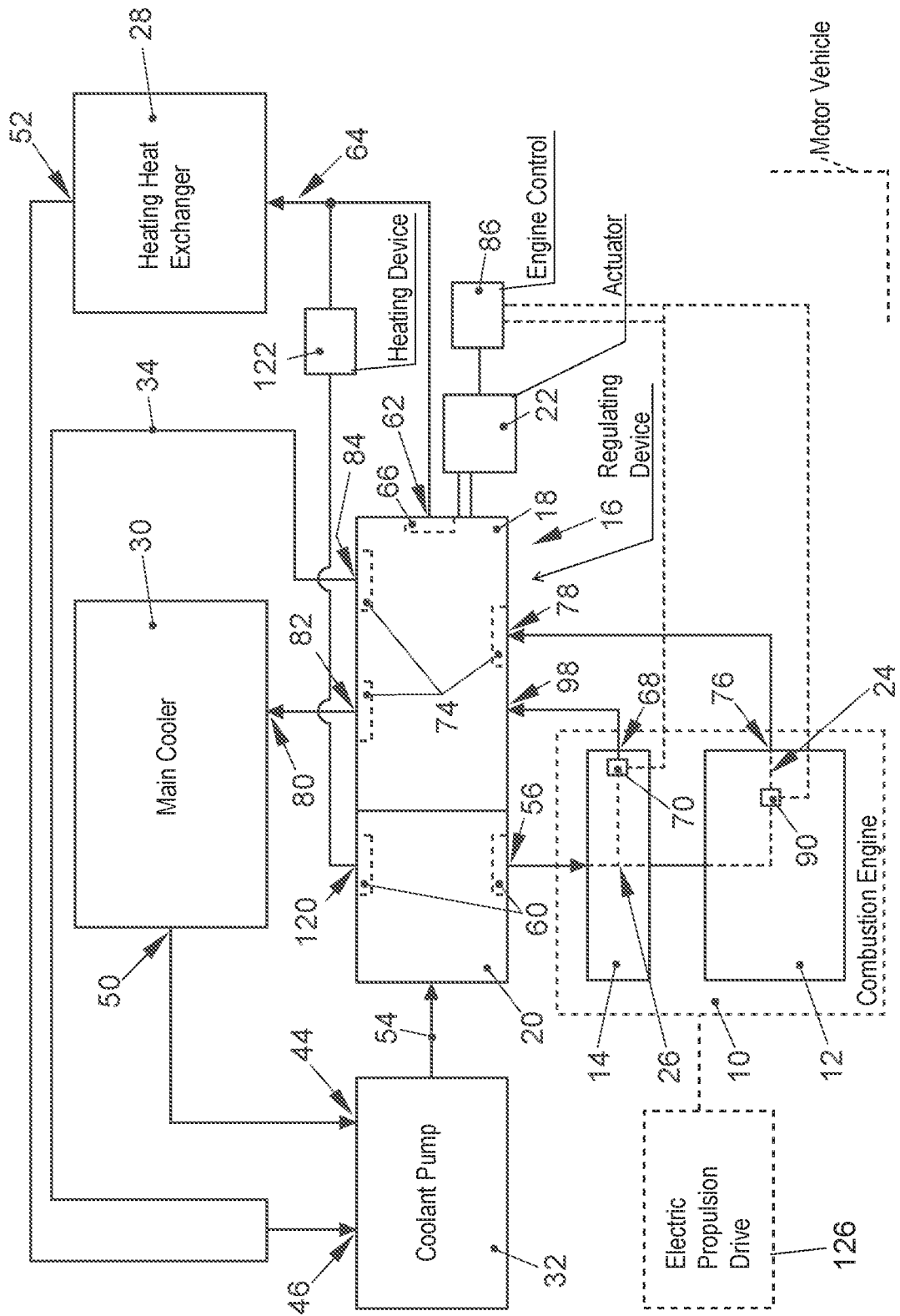
FIG. 1 is block diagram which schematically shows an internal combustion machine according to the invention.
Figure 2:
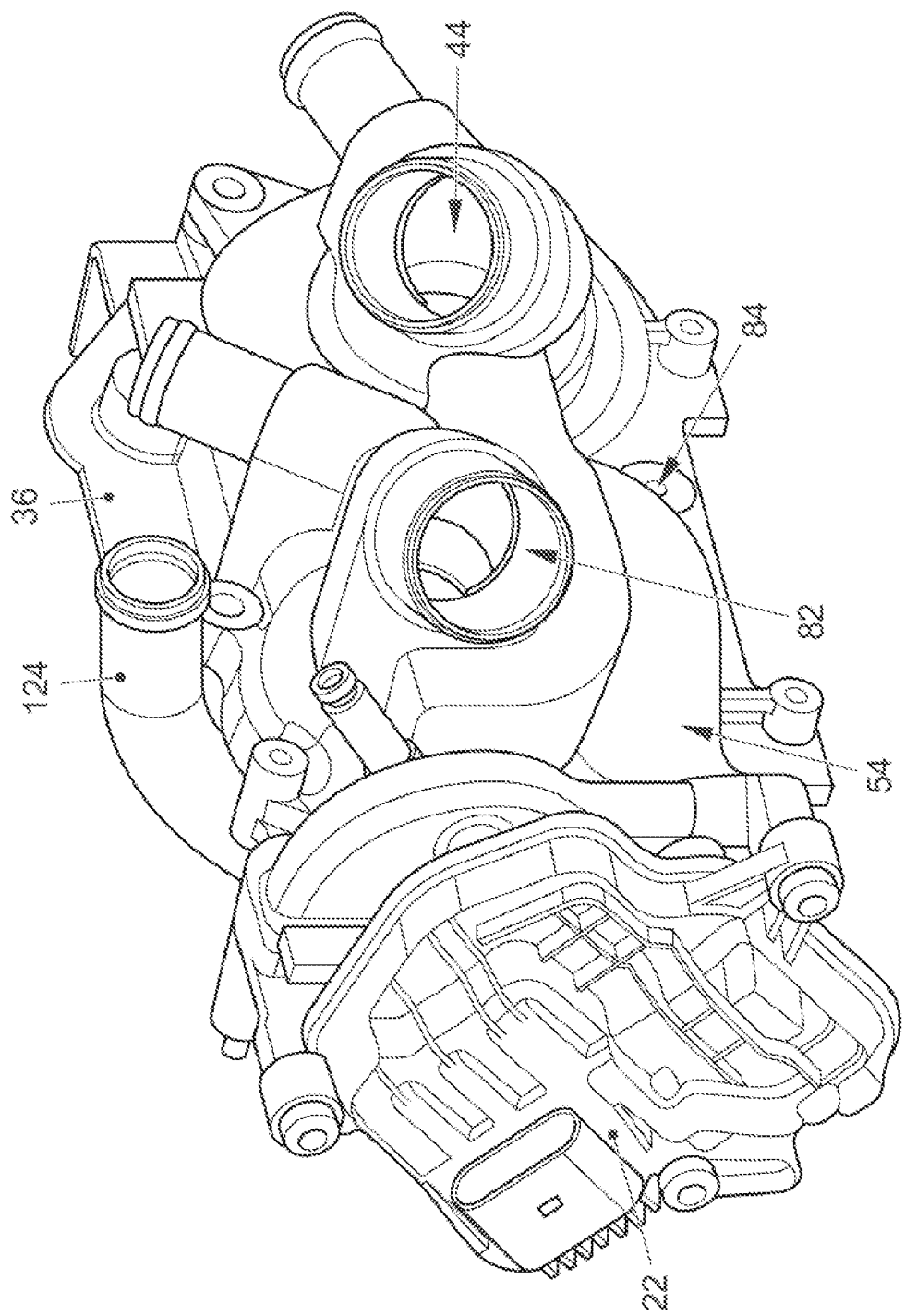
FIG. 2 is a first perspective view of a regulating device for an internal combustion machine according to the invention.
Figure 3:
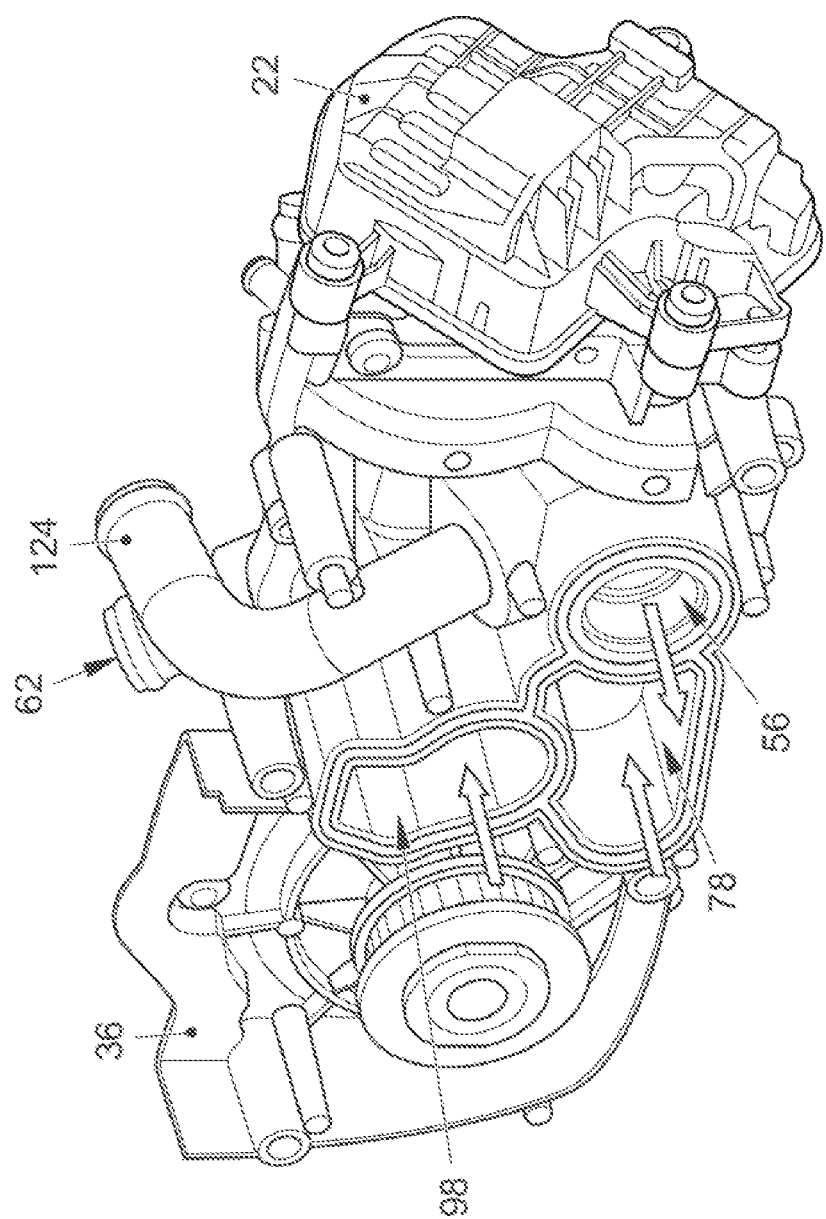
FIG. 3 is a second perspective view of the regulating device according to FIG. 2 in accordance with the invention.
Figure 4:
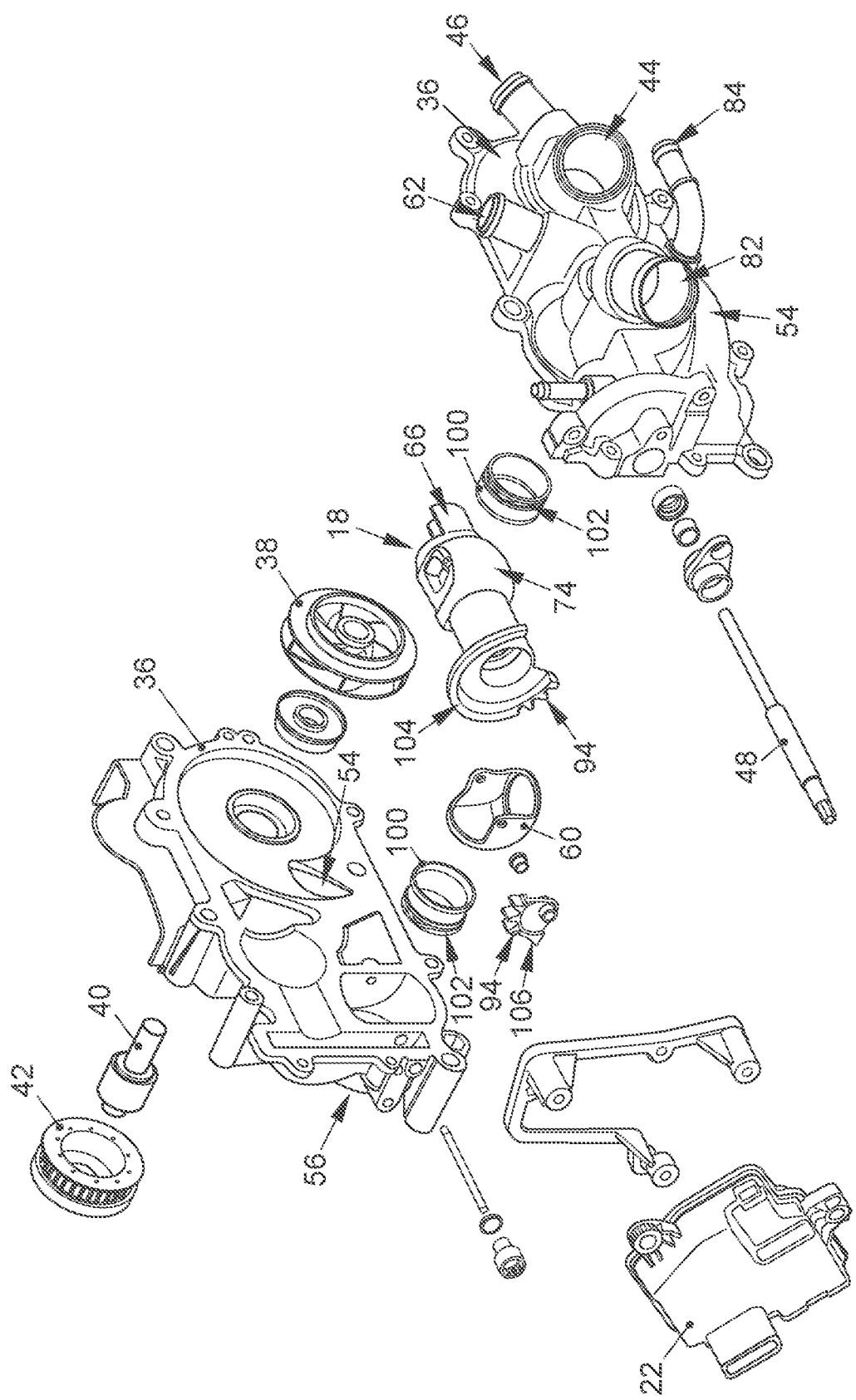
FIG. 4 is an exploded view of the regulating device according to FIGS. 2 and 3 in accordance with the invention.
Figure 6:
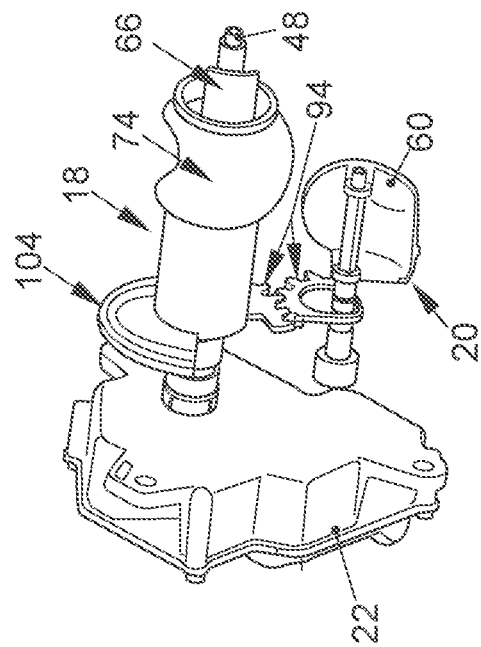
FIG. 6 is a perspective view of an actuator and the gate valves of the regulating device according to FIGS. 2 to 5 in an isolated representation, wherein the gate valves are directly or indirectly actuated by the actuator in accordance with the invention.
Figure 5:
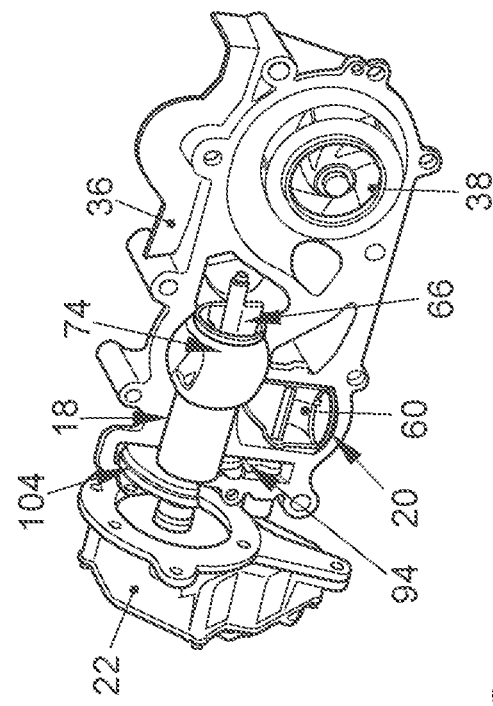
FIG. 5 is a perspective view of the regulating device according to FIGS. 2 to 4 with only a partly shown housing in accordance with the invention.
Figure 7:
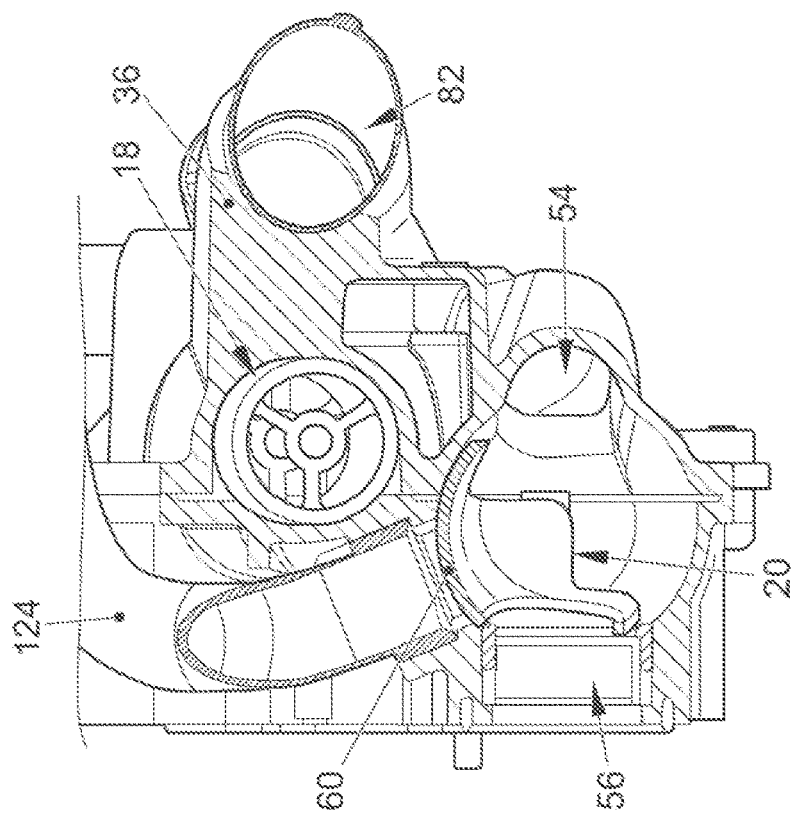
FIG. 7 is a cross-sectional view of the regulating device according to FIGS. 2 to 6 with the regulating device in a zero position according to the invention.
Figure 8:
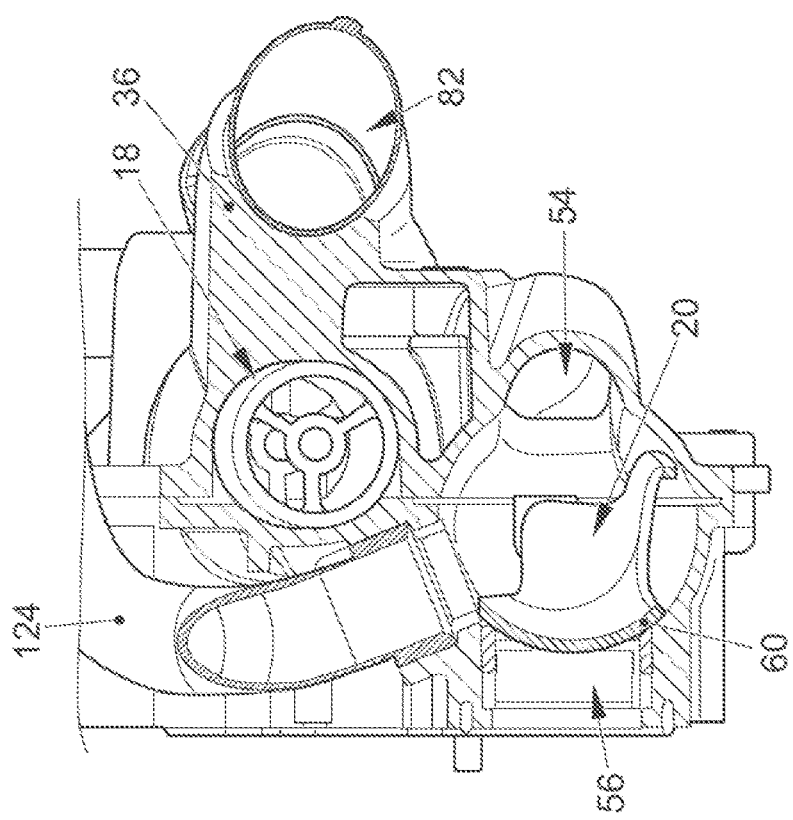
FIG. 8 is a is a cross-sectional view of the regulating device according to FIG. 7 with the regulating device in a first position in accordance with the invention.
Figure 9:
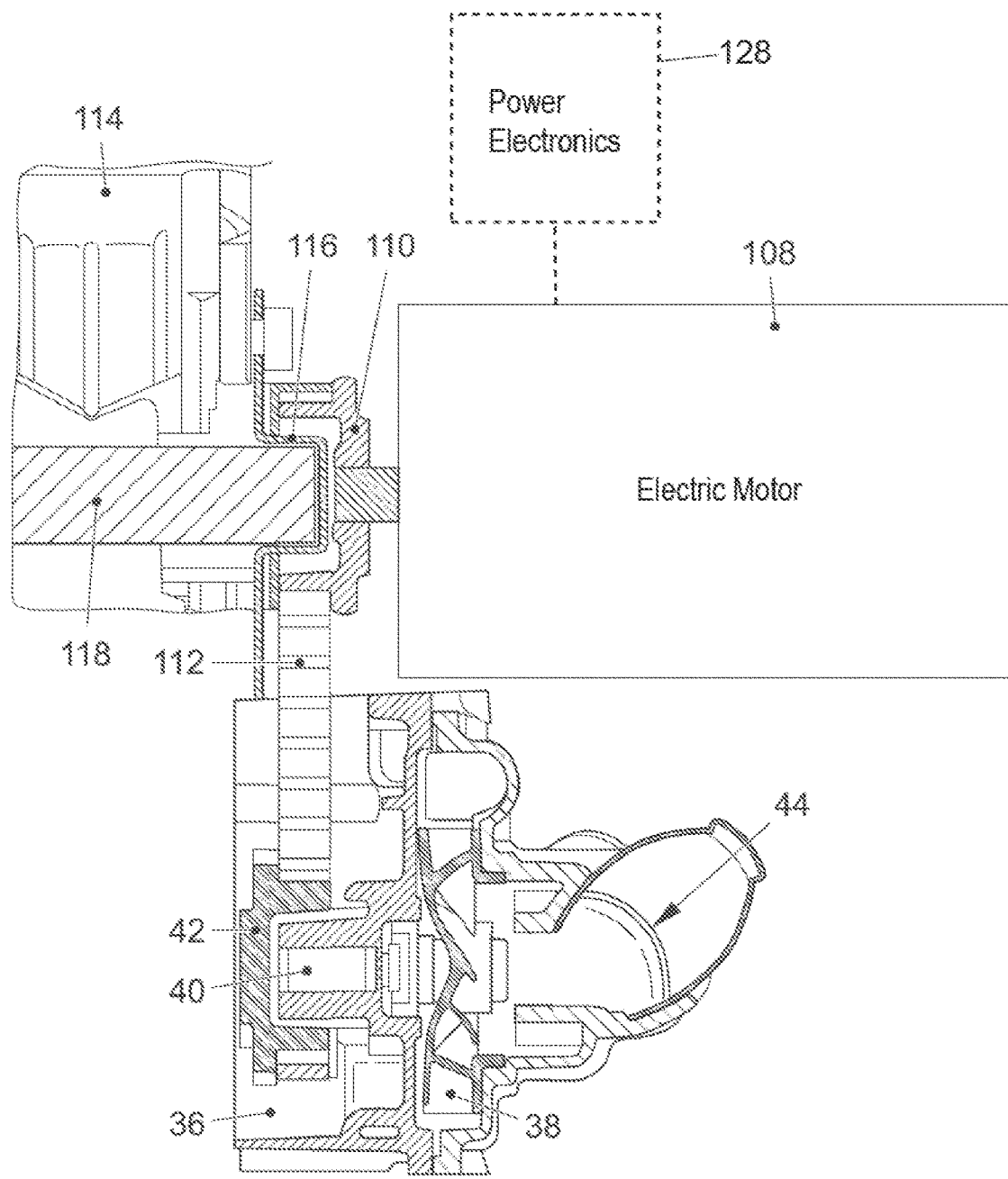
FIG. 9 is a sectional view of the drive of the coolant pump integrated in the housing of the regulating device according to FIGS. 2 to 8, the drive using an electric motor in accordance with the invention.

Referring now to the figures of the drawing in detail and first, particularly, to FIG. 1 thereof, there is schematically shown an internal combustion machine according to the invention in a motor vehicle. The motor vehicle is only schematically indicated by a dashed line. The internal combustion machine includes a combustion engine 10, which can be configured for example as a reciprocating piston combustion engine operating according to the Otto cycle principle or the Diesel cycle principle and includes a cylinder housing 12 and a cylinder head 14. In a hybrid vehicle, the internal combustion machine according to the invention can be combined with an electric propulsion drive 126. Furthermore, the internal combustion machine additionally includes a regulating device 16 with a first gate valve 18, a second gate valve 20 and an actuator 22. The first gate valve 18 is moveable through the use of the actuator 22 while the second gate valve 20 is co-moved in a section of the possible total movement of the first gate valve 18 by the same, i.e. the second gate valve 20 is moved by the first gate valve 18 such that the second gate valve 20 moves together with the first gate valve 18 in a given section of the total movement range of the first gate valve 18.

The regulating device 16 is integrated in a cooling system of the internal combustion machine. In this cooling system, coolant channels 24, 26 of the cylinder housing 12 and of the cylinder head 14, a heating heat exchanger 28, a main cooler (radiator) 30 and a coolant pump 32 are additionally integrated. The individual components of the cooling system are connected in a fluid-conducting manner via coolant lines. Furthermore, the cooling system additionally includes a bypass 34 which, bypassing both the heating heat exchanger 28 and also the main cooler 30, connects an outlet 84 of the regulating device 16 to an inlet 46 of the coolant pump 32.

FIGS. 2 to 9 show a possible construction of an embodiment of the regulating device 16 according to FIG. 1. With this regulating device 16, the gate valves 18, 20 are configured in the form of rotary slide valves, which, as a function of their respective rotary orientation, close or open inlets and outlets for the coolant flowing through the regulating device 16.

The regulating device 16 includes a housing 36 in which a pump wheel 38 of a coolant pump 32 configured as a vane pump is rotatably integrated as well. A rotation of the pump wheel 38 and thus a delivery of the coolant in the cooling system is brought about by an electric motor 108, which is connected to a shaft 40 of the pump wheel 38 via a toothed belt transmission. Power electronics 130 are optionally connected to the electric motor 108. The toothed belt transmission includes a first belt pulley 42 connected to the shaft 40 of the pump wheel 38, a second belt pulley 110 that is connected to a motor shaft of the electric motor 108 and a toothed belt 112 (see FIG. 9).

The second belt pulley 110 surrounds a section of a camshaft cover 116 cup-like which projects from a cylinder head housing 114, wherein this section of the camshaft cover 116 surrounds cup-like an end section of a camshaft 118 that is orientated approximately coaxially to the shaft of the electric motor 108 and projects out of the cylinder head housing 114. Such a cylinder head 14 is suitable (without relevant structural changes) both for the combination with a coolant pump 32 driven by an electric motor 108 shown here and also for a mechanical drive of the coolant pump 32, in which, leaving out the electric motor 108 and the camshaft cover 116, a fitting (second) belt pulley as part of the toothed belt transmission is connected to the end section of the camshaft 118 projecting out of the cylinder head housing 114. The choice of the optional drive of the coolant pump 32 by either the electric motor 108 or the camshaft 118 can be made dependent on in particular whether the internal combustion machine in a hybrid vehicle is combined with an additional electric propulsion drive 126 or this is not present in a conventional motor vehicle. In the first case, by driving the coolant pump 32 through the use of the electric motor 108, relevant advantages can be realized while in the second case the drive of the coolant pump 32 by the camshaft 118 is more cost-effectively realizable.

For delivering the coolant, the pump wheel 38 is supplied with coolant via a first inlet 44 and a second inlet 46 of the coolant pump 32. The first inlet 44 is connected to an outlet 50 of the main cooler 30 via a coolant line. The second inlet 46 is connected via coolant lines to both the bypass 34 and also to an outlet 52 of the heating heat exchanger 28. Here it is provided that the coolant line forming the bypass 34 is integrated in the housing 36 as a channel.

Through the rotation of the pump wheel 38, the coolant is conducted through a coolant channel 54 formed within the housing 36 to a first outlet 56 of the regulating device 16. In a zero position 58 of the regulating device 16, this first outlet 56 is closed (see also FIG. 7) through the use of a closure element 60 of the second gate valve 20 located in a closure position. Because of this, a coolant delivery through the combustion engine 10 is prevented. At the same time however a connection between the coolant channel 54 coming from the pump wheel 38 and a second outlet 120 of the regulating device 16 is opened by the closure element 60 so that the coolant delivered by the coolant pump 32 is conducted via the second outlet 120 and a connecting socket 124 (not shown in FIGS. 4 and 5) via a for example electrically operated heating device 122 to an inlet 64 of the heating heat exchanger 28 and from the same again to the coolant pump 32. In the zero position 58 of the regulating device 16, the coolant is accordingly delivered in a heating circuit merely including the heating device 122, the heating heat exchanger 28 and the coolant pump 32. This is provided in a non-operation of the combustion engine 10 with simultaneously demanded functionality of an interior heating supplied with heat energy via the heating heat exchanger 28 as can be the case in particular in a hybrid vehicle including an internal combustion machine according to the invention during the temporary provision of the propulsion drive power exclusively through the use of an additional electric propulsion drive 126.

In the zero position 58 of the regulating device 16, the first gate valve 18 is in an orientation in which a third outlet 62 of the regulating device 16, which via a coolant line is likewise connected to the inlet 64 of the heating heat exchanger 28, is closed through the use of a first closure element 66 of the first gate valve 18.

During a cold start of the internal combustion machine it is provided to deliver no coolant through the cooling system by not putting the electric motor 108 into operation. A cold start of the internal combustion machine is characterized in that the components of the internal combustion machine have temperatures which substantially correspond to the ambient temperature, but lie at least below a defined limit temperature. In this way, a cooling effect of the coolant for the different components of the cooling system to be cooled is avoided so that these components and in particular the cylinder head 14 which primarily transmits waste heat during the operation of the internal combustion machine are heated up as quickly as possible, which has a positive effect on the fuel consumption and the composition of the exhaust gas generated by the combustion engine 10.

After a cold start of the internal combustion machine and reaching a defined first limit value for a local coolant temperature, which is measured through the use of a first coolant temperature sensor 70 integrated in the coolant channel 26 in the vicinity of an outlet 68 of the cylinder head 14, an adjusting of the regulating device 16 from the zero position 58 into a first position 72 is effected through the use of the actuator 22. The actuator 22 to this end is activated by an engine control 86 of the internal combustion machine, which receives the signal of the coolant temperature sensor 70. Here it can be provided that the adjusting of the regulating device 16 from the zero position 58 into the first position 72 is brought about as a function of the local coolant temperature measured by the first coolant temperature sensor 70 in a stepped or stepless manner by a turning of the first gate valve 18 linked to a temperature increase and of the second gate valve 20 still rotatingly coupled therewith. In the meantime, a turning back of the gate valves 18, 20 can also be possible here. Turning of the first gate valve 18 is effected through the use of the actuator 22 which is connected to the first gate valve 18 via a shaft 48.

In the first position of the regulating device 16, the second gate valve 20 is in an opening position in which the first outlet 56 is no longer closed by the closure element 60 but is substantially opened completely. However, the closure element 60 of the second gate valve 20 now simultaneously closes the second outlet 120, as a result of which the heating circuit bypassing the combustion engine 10 is interrupted.

In the first position of the regulating device 16, the first gate valve 18 is situated in an orientation in which its first closure element 66 no longer closes the third outlet 62 but substantially opens the same completely. At the same time, a second closure element 74 of the first gate valve 18 closes a first inlet 78 of the regulating device 16 that is in connection with an outlet 76 of the cylinder housing 12, a fourth outlet 82 of the regulating device 16 that is in connection with an inlet 80 of the main cooler 30 via a coolant line and a fifth outlet 84 of the regulating device 16 that is connected to the bypass 34. In the first position of the regulating device 16, a circulating delivery of the coolant brought about by the coolant pump 32 is brought about merely in a small cooling circuit including the coolant pump 32, the regulating device 16, the cylinder head 14 and the heating heat exchanger 28.

After reaching a defined second limit value for the local coolant temperature in the cylinder head 14 measured by the first coolant temperature sensor 70, the regulating device 16 is adjusted from the first position 72 into a second position 88. Here, the first gate valve 18 is turned into an orientation in which the fifth outlet 84 is increasingly opened by the second closure element 74, as a result of which the bypass 34 is integrated in the small cooling circuit parallel to the heating heat exchanger 28. The first inlet 78 and the fourth outlet 82 of the regulating device 16 continue to be closed by the first gate valve 18. The second gate valve 20 remains in its opening position during this movement of the first gate valve 18, since the same is no longer rotatingly coupled to the first gate valve 18.

Through the integration of the bypass 34 in the cooling circuit, the volumetric flow of the coolant delivered as a whole can be increased in order to achieve a correspondingly high cooling output for the cylinder head 14.

The only phase-wise rotary coupling of the first gate valve 18 to the second gate valve 20 is brought about through segment toothings 94, which are engaged with one another only when the first gate valve 18 is turned to and fro between the zero position 58 and the first position 72 of the regulating device 16. A position-securing feature of the second gate valve 20 in its opening position is achieved by the first gate valve 18 in a form-fit manner in that a ring section 104 following the segment toothing 94 of the first gate valve 18 engages in a concave recess 106 following the segment toothing 94 of the second gate valve 20 and is slidingly moved in the same during the rotation of the first gate valve 18.

After reaching a defined third limit value for the local coolant temperature in the cylinder head 14 measured by the first coolant temperature sensor 70 and/or after reaching a first defined limit value for a local coolant temperature in the cylinder housing 12 measured by a second coolant temperature sensor 90 disposed in the vicinity of the outlet 76 of the cylinder housing 12, the regulating device 16 is adjusted from the second position 88 into an intermediate position 92. Here, the first gate valve 18 is turned into an orientation in which the second closure element 74 increasingly opens additionally also the first inlet 78 of the regulating device 16. Consequently, merely the fourth outlet 82 of the regulating device 16 is kept closed by the same and thus a flow through the main cooler 30 is prevented. In the intermediate position 92 a flow through the cylinder housing 12 by the coolant is thus also provided.

Figure 10:
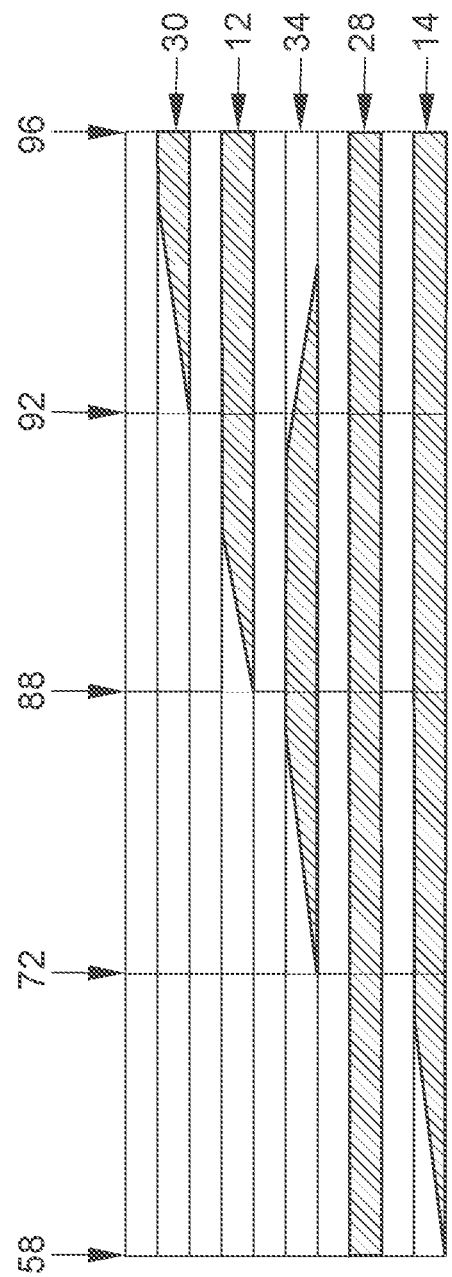
FIG. 10 is a graph illustrating the flow of the coolant through the individual components of an internal combustion machine according to FIG. 1 as a function of the various positions of the associated regulating device with a driven coolant pump according to the invention.

After reaching a defined fourth limit value for the local coolant temperature in the cylinder head 14 measured by the first coolant temperature sensor 70 and/or after reaching a second defined limit value for the local coolant temperature in the cylinder housing 12 measured by the second coolant temperature sensor 90 and/or as a function of an operating characteristic diagram of the internal combustion machine stored in the engine control 86, the regulating device 16 is adjusted from the intermediate position 92 into a third position 96. Here, an increasing opening of the fourth outlet 82 of the regulating device 16 and consequently an incorporation of the main cooler 30 in what is then a large cooling circuit takes place while at the same time the fifth outlet 84 of the regulating device 16 is increasingly closed again by the second closure element 74 of the first gate valve 18 (see FIG. 10). Because of this it is ensured that with the exception of a comparatively minor part of the coolant flow, which is conducted through the heating heat exchanger 28, the coolant is entirely conducted via the main cooler 30 and therein cooled by way of a heat transfer to ambient air.

The third position 96 of the regulating device 16 continues to be provided for a non-operation of the internal combustion machine. On the one hand, a "failsafe" functionality is thus to be realized by way of which a (functionally limited) operation of the cooling system can still be ensured in case of a defect of the actuator of the regulating device, which could have been caused by a marten bite damage or rodent bite damage during the non-operation of a motor vehicle that can be driven by the internal combustion machine. Furthermore, the third position 96 of the regulating device during the non-operation of the internal combustion machine facilitates a filling and emptying of the cooling system in the context of service or maintenance operations.

The housing 36 of the regulating device 16 is configured to be screwed directly to the cylinder head 14 of the combustion engine 10 on the side which forms the first outlet 56, the first inlet 78 and a second inlet 98, which is connected to the outlet 68 of the cylinder head 14.

A sealing of the first gate valve 18 and of the second gate valve 20 in the housing 36 is effected in each case via an annular sealing element 100 that is spring loaded (through the use of a disk spring 102).

LIST OF REFERENCE CHARACTERS

10 Combustion engine
12 Cylinder housing
14 Cylinder head
16 Regulating device
18 First gate valve
20 Second gate valve
22 Actuator
24 Coolant channel of the cylinder housing
26 Coolant channel of the cylinder head
28 Heating heat exchanger
30 Main cooler
32 Coolant pump
34 Bypass
36 Housing
38 Pump wheel 40 Shaft
42 First belt pulley
44 First inlet of the coolant pump
46 Second inlet of the coolant pump
48 Shaft
50 Outlet of the main cooler
52 Outlet of the heating heat exchanger
54 Coolant channel
56 First outlet of the regulating device
58 Zero position of the regulating device
60 Closure element of the second gate valve
62 Third outlet of the regulating device
64 Inlet of the heating heat exchanger
66 First closure element of the first gate valve
68 Outlet of the cylinder head
70 First coolant temperature sensor
72 First position of the regulating device
74 Second closure element of the first gate valve
76 Outlet of the cylinder housing
78 First inlet of the regulating device
80 Inlet of the main cooler
82 Fourth outlet of the regulating device
84 Fifth outlet of the regulating device
86 Engine control
88 Second position of the regulating device
90 Second coolant temperature sensor
92 Intermediate position of the regulating device
94 Segment toothing
96 Third position of the regulating device
98 Second inlet of the regulating device
100 Sealing element
102 Disk spring
104 Ring section
106 Recess
108 Electric motor
110 Second belt pulley
112 Toothed belt
114 Cylinder head housing
116 Camshaft cover
118 Camshaft
120 Second outlet of the regulating device
122 Heating device
124 Connection socket
126 Electric propulsion drive
128 Power electronics

What is claimed is:

1. A machine comprising:
a combustion engine;
a cooling system having a coolant pump, a main cooler, a heating heat exchanger, a bypass for bypassing said heating heat exchanger, a plurality of coolant channels in said combustion engine, and a regulating device with an actuator, the regulating device configured to regulate a distribution of a coolant as a function of at least one local coolant temperature;
said regulating device including a first gate valve and a second gate valve, wherein said first gate valve is moved by said actuator, and said second gate valve is moved by said first gate valve, wherein a position of said second gate valve can be in an open position in which a first outlet of said regulating device is opened by said second gate valve and a second outlet of said regulating device is closed by said second gate valve, or a closed position in which said first outlet of said regulating device is closed by said second gate valve and said second outlet of said regulating device is opened by said second gate valve, wherein said first outlet of said regulating device directs the coolant to said combustion engine and said second outlet of said regulating device directs the coolant to an inlet of said heating heat exchanger;
said main cooler being configured to transfer heat from the coolant to ambient air solely in order to cool the coolant;
said heating heat exchanger being configured to transfer heat from the coolant to ambient air in order to heat a motor vehicle interior;
said regulating device, upon activation of said actuator in a given direction:
in a zero position of said regulating device, said regulating device preventing coolant flow through a cylinder head and a cylinder housing of said combustion engine and permitting coolant flow through said heating heat exchanger by orienting said second gate valve into the closed position;
in a first position of said regulating device, said regulating device permitting coolant flow through said cylinder head of said combustion engine and said heating heat exchanger and preventing coolant flow through said bypass and said main cooler after reaching a defined first limit value for the at least one local coolant temperature by orienting said second gate valve to said open position and by orienting said first gate valve to open a third outlet of said regulating device, which directs the coolant to the inlet of said heating heat exchanger, and to close a first inlet of said regulating device, which receives the coolant from said cylinder housing of said combustion engine, to close a fourth outlet of said regulating device, which directs the coolant to an inlet of said main cooler, and to close a fifth outlet of said regulating device, which directs the coolant to said bypass;
in a second position of said regulating device, said regulating device permitting coolant flow through said cylinder head of said combustion engine, said heating heat exchanger, and said bypass and preventing coolant flow through said main cooler after reaching a defined second limit value for the at least one local coolant temperature by orienting said first gate valve to open said fifth outlet of said regulating device; and
in a third position of said regulating device, said regulating device permitting coolant flow through said cylinder head and said cylinder housing of said combustion engine, said heating heat exchanger, and said main cooler and preventing coolant flow through said bypass after reaching at least one further defined limit value for the at least one local coolant temperature by orienting said first gate valve to open said fourth outlet of said regulating device, opening said first inlet of said regulating device and closing said fifth outlet of said regulating device.

2. The machine according to claim 1, further including a heating device, said heating device serving as a heat source for transferring heat energy to the coolant, wherein in the zero position of said regulating device, said regulating device is preventing coolant flow through said combustion engine and permitting coolant flow through said heating heat exchanger and through said heating device.

3. The machine according to claim 1, wherein:
said cooling system includes a direct coolant flow connection from said coolant pump to said heating heat exchanger;

said direct coolant flow connection is configured such that coolant flow from said coolant pump to said heating heat exchanger does not flow through any of said main cooler, said bypass, and said plurality of coolant channels in said combustion engine; and said regulating device in at least one position selected from the group consisting of the first position, the second position, and the third position prevents coolant flow through said direct coolant flow connection.

4. The internal combustion machine according to claim 1, wherein said first gate valve has a movement range, said first gate valve moves said second gate valve in only a part of the movement range of said first gate valve.

5. The internal combustion machine according to claim 1, wherein at least one of said first gate valve and said second gate valve is configured as a rotary slide valve.

6. The machine according to claim 1, further including a coolant temperature sensor disposed in at least one of said plurality of coolant channels.

7. The machine according to claim 1, wherein said regulating device is adjustable between the second position and the third position as a function of an operating characteristic diagram, the operating characteristic diagram plotting a load over a rotational speed with which the combustion engine is operated.

8. The machine according to claim 1, further including an electric motor, said coolant pump having a delivery element, said delivery element being drivable by said electric motor.

9. The machine according to claim 8, further including a transmission, said delivery element of said coolant pump being drivable by said electric motor via said transmission, said transmission being one of a belt transmission and a gearwheel transmission.

10. The machine according to claim 8, wherein said cooling system further includes a coolant pump drive cooling circuit, said coolant pump drive cooling circuit configured to circulate the coolant said electric motor for cooling said electric motor.

11. The machine according to claim 8, further including:
power electronics connected to said electric motor; and
said cooling system including a coolant pump drive cooling circuit, said coolant pump drive cooling circuit configured to circulate the coolant by at least one of said electric motor and said power electronics for cooling the at least one of said electric motor and said power electronics.

12. A motor vehicle comprising:
a combustion engine for generating a propulsion drive power;
a cooling system having a coolant pump, a main cooler, a heating heat exchanger, a bypass for bypassing said heating heat exchanger, a plurality of coolant channels in said combustion engine, and a regulating device with an actuator, the regulating device configured to regulate a for a distribution of a coolant as a function of at least one local coolant temperature;
said regulating device including a first gate valve and a second gate valve, wherein said first gate valve is moved by said actuator, and said second gate valve is moved by said first gate valve, wherein a position of said second gate valve can be in an open position in which a first outlet of said regulating device is opened by said second gate valve and a second outlet of said regulating device is closed by said second gate valve, or a closed position in which said first outlet of said regulating device is closed by said second gate valve and said second outlet of said regulating device is opened by said second gate valve, wherein said first outlet of said regulating device directs the coolant to said combustion engine and said second outlet of said regulating device directs the coolant to an inlet of said heating heat exchanger;
said main cooler being configured to transfer heat from the coolant to ambient air solely in order to cool the coolant;
said heating heat exchanger being configured to transfer heat from the coolant to ambient air in order to heat an interior of the motor vehicle;
said regulating device, upon activation of said actuator in a given direction:
in a zero position of said regulating device, said regulating device preventing coolant flow through a cylinder head and a cylinder housing of said combustion engine and permitting coolant flow through said heating heat exchanger by orienting said second gate valve into the closed position;
in a first position of said regulating device, said regulating device permitting coolant flow through said cylinder head of said combustion engine and said heating heat exchanger and preventing coolant flow through said bypass and said main cooler after reaching a defined first limit value for the at least one local coolant temperature by orienting said second gate valve to said open position and by orienting said first gate valve to open a third outlet of said regulating device, which directs the coolant to the inlet of said heating heat exchanger, and to close a first inlet of said regulating device, which receives the coolant from said cylinder housing of said combustion engine, to close a fourth outlet of said regulating device, which directs the coolant to an inlet of said main cooler, and to close a fifth outlet of said regulating device, which directs the coolant to said bypass;
in a second position of said regulating device, said regulating device permitting coolant flow through said cylinder head of said combustion engine, said heating heat exchanger, and said bypass and preventing coolant flow through said main cooler after reaching a defined second limit value for the at least one local coolant temperature by orienting said first gate valve to open said fifth outlet of said regulating device; and
in a third position of said regulating device, said regulating device permitting coolant flow through said cylinder head and said cylinder housing of said combustion engine, said heating heat exchanger, and said main cooler and preventing coolant flow through said bypass after reaching at least one further defined limit value for the at least one local coolant temperature by orienting said first gate valve to open said fourth outlet of said regulating device, opening said first inlet of said regulating device and closing said fifth outlet of said regulating device.

13. The motor vehicle according to claim 12, additionally including an electric propulsion drive.

14. A method for operating a motor vehicle, the method comprising:
providing a combustion engine, an electric propulsion drive, and a cooling system having a coolant pump, a main cooler, a heating heat exchanger, a bypass for bypassing the heating heat exchanger, a plurality of coolant channels in the combustion engine, and a regulating device with an actuator, the regulating device configured to regulate a distribution of a coolant as a function of at least one local coolant temperature, the main cooler being configured to transfer heat from the coolant to ambient air solely in order to cool the coolant, the heating heat exchanger being configured to transfer heat from the coolant to ambient air in order to heat an interior of the motor vehicle, the regulating device including a first gate valve and a second gate valve, wherein the first gate valve is moved by the actuator, and the second gate valve is moved by the first gate valve, wherein a position of the second gate valve can be an open position in which a first outlet of the regulating device is opened by the second gate valve and a second outlet of the regulating device is closed by the second gate valve, or a closed position in which the first outlet of the regulating device is closed by the second gate valve and the second outlet of the regulating device is opened by the second gate valve, wherein the first outlet of the regulating device directs the coolant to the combustion engine and the second outlet of the regulating device directs the coolant to an inlet of the heating heat exchanger;

permitting coolant flow through a cylinder head of the combustion engine and the heating head exchanger and preventing coolant flow through the bypass and the main cooler in a first position of the regulating device upon activating the actuator in a given direction after reaching a defined first limit value for the at least one local coolant temperature by orienting the second gate valve to the open position and by orienting the first gate valve to open a third outlet of the regulating device, which directs the coolant to the inlet of the heating heat exchanger, and to close a first inlet of the regulating device, which receives the coolant from a cylinder housing of the combustion engine, to close a fourth outlet of the regulating device, which directs the coolant to an inlet of the main cooler, and to close a fifth outlet of the regulating device, which directs the coolant to the bypass;

permitting coolant flow through the cylinder head of the combustion engine, the heating heat exchanger, and through the bypass and preventing coolant flow through the main cooler in a second position of the regulating device after reaching a defined second limit value for the at least one local coolant temperature by orienting the first gate valve to open the fifth outlet of the regulating device; and permitting coolant flow through the cylinder head and the cylinder housing of the combustion engine, the heating heat exchanger, and the main cooler and preventing coolant flow through the bypass in a third position of the regulating device after reaching at least one further defined limit value for the at least one local coolant temperature by orienting the first gate valve to open the fourth outlet of the regulating device, opening the first inlet of the regulating device, and closing the fifth outlet of the regulating device;

preventing coolant flow through the cylinder head and the cylinder housing of the combustion engine and permitting coolant flow through the heating heat exchanger in a zero position of the regulating device by orienting the second gate valve into the closed position; and holding the regulating device in the zero position when the combustion engine is not in operation and during a generation of propulsion drive power by the electric propulsion drive.

15. The method according to claim 14, further comprising:
providing a heating device, the heating device serving as a heat source for transferring heat energy to the coolant, and permitting coolant flow through the heating device and through the heating heat exchanger and preventing coolant flow through the cylinder head and the cylinder housing of the combustion engine in the zero position of the regulating device.

16. The method according to claim 14, further comprising:
providing a direct coolant flow connection from the coolant pump to the heating heat exchanger, the direct coolant flow connection being configured such that coolant flow from the coolant pump to the heating heat exchanger does not flow through any of said main cooler, said bypass, and said plurality of coolant channels in said combustion engine; and
preventing coolant flow through the direct coolant flow connection in at least one position of the regulating device selected from the group consisting of the first position, the second position, and the third position.

* * * * *

UNITED STATES PATENT AND TRADEMARK OFFICE
CERTIFICATE OF CORRECTION

PATENT NO. : 11,035,285 B2
APPLICATION NO. : 15/788426
DATED : June 15, 2021
INVENTOR(S) : Manfred Kloft, Tobias Jaeckel and Ralf Lüders It is certified that error appears in the above-identified patent and that said Letters Patent is hereby corrected as shown below:

In the Claims

Column 19, Line 37: Claim 10 "to circulate the coolant" should read: --to circulate the coolant by--

Column 19, Line 55: Claim 12 "a for a distribution" should read: --a distribution--

Signed and Sealed this
Twentieth Day of July, 2021

Drew Hirshfeld
*Performing the Functions and Duties of the*
*Under Secretary of Commerce for Intellectual Property and*
*Director of the United States Patent and Trademark Office*